Patented Sept. 6, 1938

2,129,014

UNITED STATES PATENT OFFICE 2,129,014

DYESTUFFS OF THE ANTHRACENE SERIES

Frank Lodge and Colin Henry Lumsden, Blackley, Manchester, England, assignors to Imperial Chemical Industries Limited, a corporation of Great Britain No Drawing. Application January 13, 1933, Serial No. 651,623. In Great Britain January 29, 1932

16 Claims. (Cl. 260—243)

This invention relates to the manufacture of new anthracene and anthraquinone dyestuffs.

More particularly, this invention deals with thioindigoid dyestuffs of the anthracene series having the following general formula:

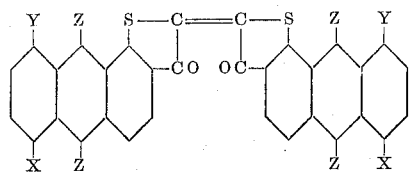

wherein Z stands for an oxygen atom, a hydrogen atom or an intermediate stage of reduction; one of the letters X and Y stands for an organic or inorganic substituent, while the other letter stands for hydrogen or the same or a different substituent. For simplicity we shall hereinafter refer to our novel compounds as vis-a-vis-α-substituted 1.2-thioindigoid compounds of the anthracene series.

According to the invention we obtain new dyestuffs of the general formulae:

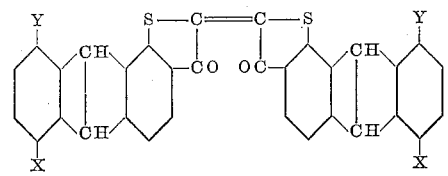

and

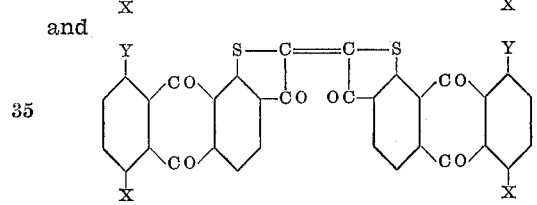

where either X or Y stands for a substituent of a kind hereinafter more particularly defined, and wherein the anthracene or anthraquinone residues may contain other substituents, by treating an anthracene or anthraquinone-1-thioglycollic acid of the general formula:

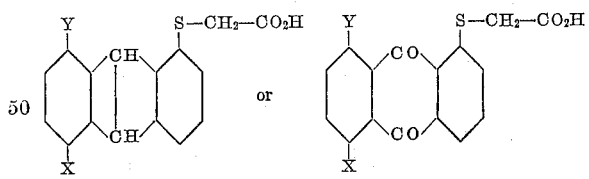

(X and Y having the same significance as before), itself obtained by interaction of a halogenacetic acid with the corresponding mercapto compound, with chlorosulphonic acid or a mixture of chlorosulphonic acid and sulphuric acid.

The substituents represented by X and Y in the above formula may be halogen (particularly chlorine or bromine), the nitro-, sulpho- or carboxy- group, the hydroxy- or amino- group, or substituted hydroxy- or amino- groups. When an amino group is substituted the substituent may be alkyl or acyl, and if acyl the acyl group may form part of a ring structure, as in the lactam compounds hereinafter described.

According to the nature of the substituents the products of the invention are vat or acid dyestuffs, or, suitably treated, they may be applied by the methods described in the British patent, No. 377,740.

The ring-closure condensation to the thioindigoid grouping according to the invention proceeds with remarkable ease, and this is surprising because with an anthraquinone-1-thioglycollic acid devoid of substituents in the 5 and 8 positions ring-closure condensation does not readily take place, if at all. Not only so, but known methods for making thioindigoid dyestuffs of the anthraquinone series involve a tedious production of a 1.2- or 2.1-carboxy-anthraquinonyl-thioglycollic acid. Hence great technical advantages accrue from the present invention.

The invention is illustrated, but not limited, by the following examples, in which the parts are by weight.

Example 1

5 parts of the compound

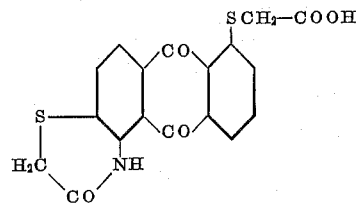

(prepared in the manner described in British Patent 398,162, are added with stirring to 30 parts of chlorosulphonic acid at 20–25° C. The mixture is stirred for 20–24 hours at room temperature. The original red-violet color of the solution changes to dark green and hydrogen chloride is evolved.

The product is isolated by pouring the reaction mixture into a mixture of ice and water, filtering the brown suspension and washing the dyestuff with water until acid-free, and drying it.

The so-obtained dyestuff is a brown-black powder, soluble in concentrated sulphuric acid to a dark green solution, and in alkaline hydrosulphite to an orange-brown solution. Vatted on cotton a valuable pure brown is obtained. The dyestuff may be treated with aqueous alkali, to open up the lactam rings, and may then be applied to wool in the manner described in British patent, No. 377,740.

Example 2

5 parts of the compound

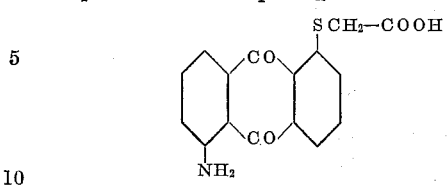

(obtained by treating 1-amino-5-mercapto-anthraquinone—Gattermann, Liebig's Annalen, 1912, vol. 393, page 168—with sodium chloro-acetate) are added with stirring to 30 parts of chlorosulphonic acid at 20–25° C. The mixture is stirred for 20 hours at this temperature. The original brown color of the reaction mixture changes to an intense green.

The dyestuff is isolated as in Example 1. It dissolves in concentrated sulphuric acid to an intense green solution. With alkali hydrosulphite the product vats readily to a clear orange vat. Cotton is dyed from the vat in reddish-brown shades.

Example 3

5 parts of the compound

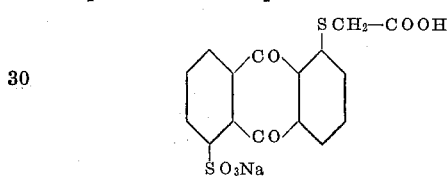

(obtained by treating 1-mercapto-anthraquinone-5-sulphonic acid—Gattermann, loc. cit., page 178—with sodium chloro-acetate) are added with stirring to 30 parts of chlorosulphonic acid at 20–25° C. The mixture is stirred for 20–24 hours at 20–25° C. The dyestuff is isolated by pouring on to ice and water, filtering off the dark brown suspension and washing acid-free with 10% brine solution, and is then dried at 50–100° C. The product is a dark brown powder, soluble in cold water to a grey-brown solution. It dyes wool from an acid bath.

Example 4

5 parts of the compound

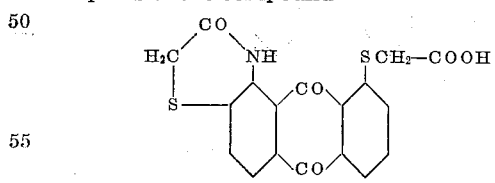

obtained according to British Patent 398,162, are added to 30 parts of chlorosulphonic acid at 20–25° C. The mixture is stirred for 20–24 hours at 20–25° C. and the temperature is then raised to 50° C. for 2 hours. The original violet colored solution changes to brown.

The product is isolated as in Example 1. The dyestuff dissolves in concentrated sulphuric acid to a brown solution. It vats readily to a brown vat and dyes cotton thence in brown shades.

Example 5

5 parts of the compound

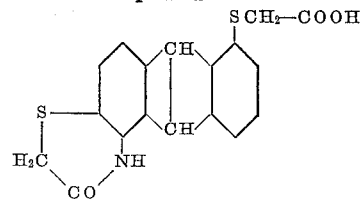

(obtained from the compound described in Example 1 by boiling with ammonia and zinc dust, filtering the pale solution obtained to free from zinc, and precipitating the product by adding hydrochloric acid) are added with stirring to 30 parts of chlorosulphonic acid at 20–25° C. and stirred for 20–24 hours at 20–25° C.

The product is isolated as in Example 1. The shade on cotton is brown.

Example 6

5 parts of the compound

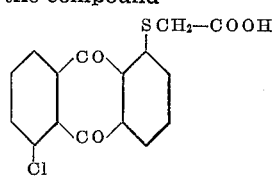

obtained by diazotization and subjection to Sandmeyer reaction of 5-amino-anthraquinone-1-thioglycollic acid are dissolved in 30 parts of chlorosulphonic acid at 20–25° C. and stirred 18 hours at room temperature.

The product is isolated as in Example 1. When dry it forms a brown-black powder which dissolved in concentrated sulphuric acid with a brown color. It vats readily to a clear orange-brown vat and dyes cotton thence in brown shades.

In the above preparation 30 parts of a mixture of chlorosulphonic acid and monohydrate in equal parts may be employed to give the same product.

Example 7

The dyestuff paste from Example 2, before drying, is heated with 50 parts of nitrobenzene until all water is removed. 5 parts of benzoyl chloride are added to the nitrobenzene mixture at 100° C. and the whole warmed to 200° C. for 1 hour. The product is filtered at 100° C., washed successively with nitrobenzene and alcohol, and dried.

The benzoylated dyestuff is a chocolate-brown powder which dissolves in concentrated sulphuric acid with greenish color. It vats readily to an orange-brown solution and dyes cotton thence in khaki brown shades. Its constitution most probably corresponds to the formula:

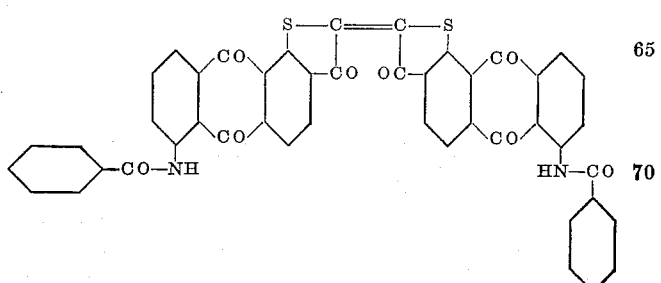

Example 8

5 parts of the compound

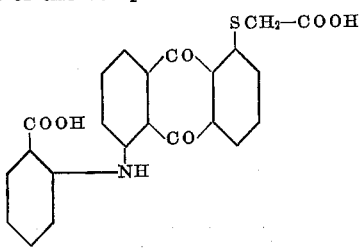

prepared by condensing 5-chloro-anthraquinone-thioglycollic acid with anthranilic acid, are dissolved in 30 parts of chlorosulphonic acid at room temperature and stirred 18 hours.

The product is isolated as in Example 1. When dry, it forms a brown-black powder soluble in concentrated sulphuric acid with brown color. It vats readily to a dark green solution and dyes cotton thence in purple-brown shades.

Other typical bodies to which the reaction may be applied are:

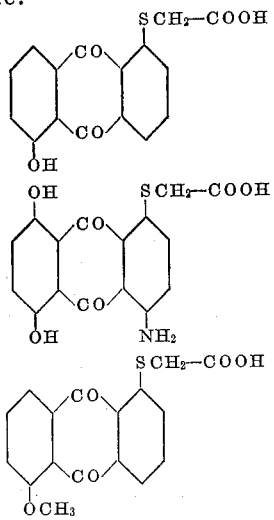

The process of forming the initial materials used in Examples 1 and 4, and alluded to briefly by reference to British Patent 398,162, consists essentially of the following steps.

1-nitro-anthraquinone-5 or 8-sodium-sulfonate is fused in a large excess of crystalline sodium sulfide at a temperature of about 140° C. under a reflux column. The resultant 1-amino-2.5- or 2.8-dimercapto-anthraquinone is isolated as sodium salt and reacted with an excess of sodium-chloro-acetate. The resultant amino-anthraquinone-dithioglycollic acid is then lactamized by boiling in dilute hydrochloric acid.

It will be understood that many variations and modifications are possible in our preferred mode of operation without departing from the spirit of this invention.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. Thioindigoid compounds of the formula

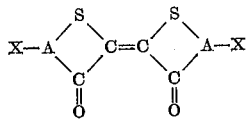

wherein A represents identical radicals of the anthracene series to which the thiophene groups are linked in the 1.2-1'.2' positions and X in both cases represents identical substituents in corresponding alpha positions of the benzene rings of the anthracene nuclei remote from the benzene rings to which the thiophene groups are attached.

2. Thioindigoid compounds of the formula

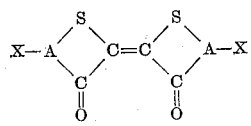

wherein A represents identical radicals of the anthracene series to which the thiophene groups are linked in the 1.2-1'.2' positions and X in both cases represents identical substituents selected from the group consisting of halogen, nitro, sulpho, carboxy, hydroxy, alcoxy, amino, alkylamino, acylamino and the amino group of a lactam ring, said substituents being present in an alpha position of the benzene rings of the anthracene nuclei remote from the benzene rings to which the thiophene groups are attached.

3. Thioindigoid compounds of the formula

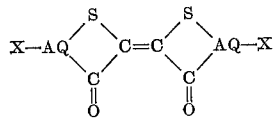

wherein AQ represents identical radicals of the anthraquinone series to which the thiophene groups are linked in the 1.2- 1'.2' positions and X in both cases represents identical substituents selected from the group consisting of halogen, nitro, sulpho, carboxy, hydroxy, alkoxy, amino, alkylamino, acylamino and the amino group of a lactam ring, said substituents being present in an alpha position of the benzene rings of the anthraquinone nuclei remote from the benzene rings to which the thiophene groups are attached.

4. Thioindigoid compounds of the formula

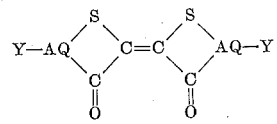

wherein AQ represents identical radicals of the anthraquinone series to which the thiophene groups are linked in the 1.2- 1'.2' positions and Y in both cases represents identical amino radicals which are present in an alpha position of the benzene nuclei of the anthraquinone group remote from the benzene ring to which the thiophene groups are attached.

5. The compound whose constitution corresponds to the following formula

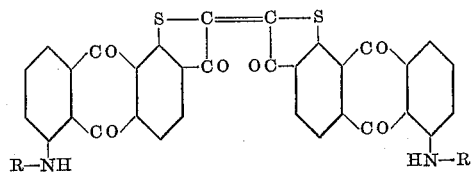

wherein R in both cases represents identical acidyl radicals.

6. The compound whose constitution corresponds to the following formula

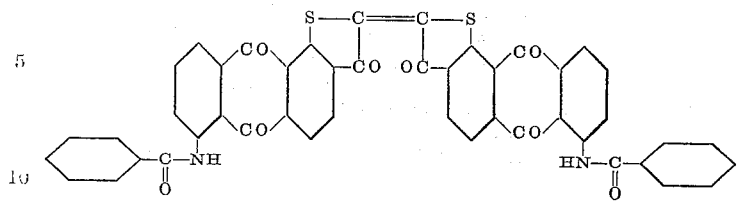

7. A 1.2-anthraquinone-thioindigoid compound carrying a lactam ring in the corresponding alpha-beta positions of the benzene ring of the anthraquinone nuclei remote from the benzene rings to which the thiophene groups are attached, the amino group of the lactam ring in all cases being attached in the alpha position, said lactam ring being hydrolyzable to the alpha-amino-beta-thioglycollic acid.

8. An anthraquinone-1.2-thioindigoid dyestuff substituted in the 5.6 positions by the lactam corresponding to o-amino-thioglycollic acid.

9. The compound of the formula

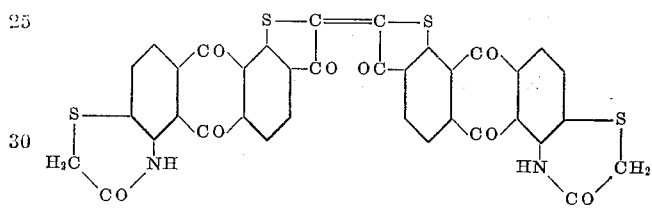

said compound being adapted to dye cotton by the vatting process, and wool by the process of opening the lactam ring and relactamizing on the fiber.

10. A process for producing a 1.2-thioindigoid compound of the anthracene series, which comprises reacting with a dehydrating agent comprising essentially chlorosulphonic acid upon a 1-thioglycollic acid of the anthracene series containing a substituent in at least one of the 5.8 positions.

11. A process for producing a 1.2-thioindigoid compound of the anthraquinone series, which comprises reacting with chlorosulphonic acid upon a 1-anthraquinone-thioglycollic acid carrying in at least one of the positions 5 and 8 a substituent of the group consisting of halogen, nitro, sulpho, carboxy, hydroxy, alcoxy, amino, alkylamino, acylamino and the amino group of a lactam ring.

12. The process for producing a 1.2-thioindigoid compound of the anthraquinone series which comprises reacting with chlorosulphonic acid upon a 1-anthraquinone-thioglycollic acid containing in one of the positions 5 and 8 an amino group.

13. A process for producing a 1.2-thioindigoid compound of the anthraquinone series, which comprises reacting with chlorosulphonic acid upon a 5-amino-anthraquinone-1-thioglycollic acid.

14. A process for producing a 1.2-thioindigoid compound of the anthraquinone series, which comprises reacting with chlorosulphonic acid upon a 5-amino-anthraquinone-1-thioglycollic acid, recovering the reaction product free of acid and water, and reacting upon the same further with benzoyl chloride in an inert organic liquid medium.

15. A process for producing a 1.2-thioindigoid compound of the anthraquinone series, which comprises reacting with chlorosulphonic acid upon a 1-anthraquinone-thioglycollic acid carrying in one of the pairs of positions 5.6 and 8.7 a lactam ring corresponding to an alpha-amino-beta-thioglycollic acid.

16. A process for producing a 1.2-thioindigoid compound of the anthraquinone series, which comprises reacting with chlorosulphonic acid upon the compound which corresponds to the formula

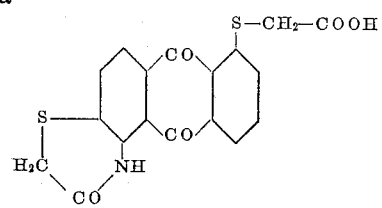

FRANK LODGE.
COLIN HENRY LUMSDEN.